United States Patent [19]

Steudle

[11] Patent Number: 4,498,641
[45] Date of Patent: Feb. 12, 1985

[54] MOUNTING BRACKET ASSEMBLY FOR FISHING REELS

[75] Inventor: Ernst W. Steudle, Fraser, Mich.

[73] Assignee: U.S. Properties Inc., Fraser, Mich.

[21] Appl. No.: 590,834

[22] Filed: Mar. 19, 1984

[51] Int. Cl.³ .................. B65H 17/52; A47H 1/00; B65D 85/00; A63B 55/00; A01K 27/06
[52] U.S. Cl. .................. 242/106; 206/315.11; 206/45.14; 242/84.1 R; 43/22; 248/251; 248/309.1
[58] Field of Search .......... 206/315.11; 248/251, 248/309 R, 200; 43/22; 242/106, 104, 84.1 R

[56] References Cited

U.S. PATENT DOCUMENTS

| | | | |
|---|---|---|---|
| 498,307 | 5/1893 | Rule | 242/106 |
| 1,018,550 | 2/1912 | Brearey | 242/104 |
| 1,510,906 | 10/1924 | Shakespeare, Jr. | 43/22 |
| 1,902,749 | 3/1933 | Baird et al. | 43/22 |
| 2,601,959 | 7/1952 | Busse | 242/104 |
| 2,659,544 | 11/1953 | Freeman | 43/22 |
| 2,780,883 | 2/1957 | Macy | 43/22 |
| 2,814,147 | 11/1957 | Henshaw | 43/22 |
| 2,837,858 | 6/1958 | Benson | 43/22 |
| 3,074,198 | 1/1963 | Bush | 43/22 |
| 4,187,633 | 2/1980 | Ohmura | 43/22 |
| 4,378,882 | 4/1983 | Miller | 43/22 |

Primary Examiner—William T. Dixson, Jr.
Attorney, Agent, or Firm—Gerald E. McGlynn, Jr.

[57] ABSTRACT

A bracket assembly for storing a fishing reel comprising a bracket and a pair of retainer clips. The bracket is formed from a single strip of metal and includes a main body portion having an arcuate transverse cross section adapted to seat the arcuate foot portion of a reel to be stored. The retainer clips also have an arcuate transverse cross section and are adapted to slide over the opposite ends of the foot portion of the reel to securely mount the reel on the bracket. The concave under portion of each clip coacts with the concave under surface of the bracket main body portion to preclude rotation of the stored reel relative to the bracket. A pair of legs extend downwardly from each end of the bracket main body portion and terminate in flange portions which coact with fastener elements to mount the bracket on a suitable support surface with the bracket main body portion spaced from the support surface.

10 Claims, 3 Drawing Figures

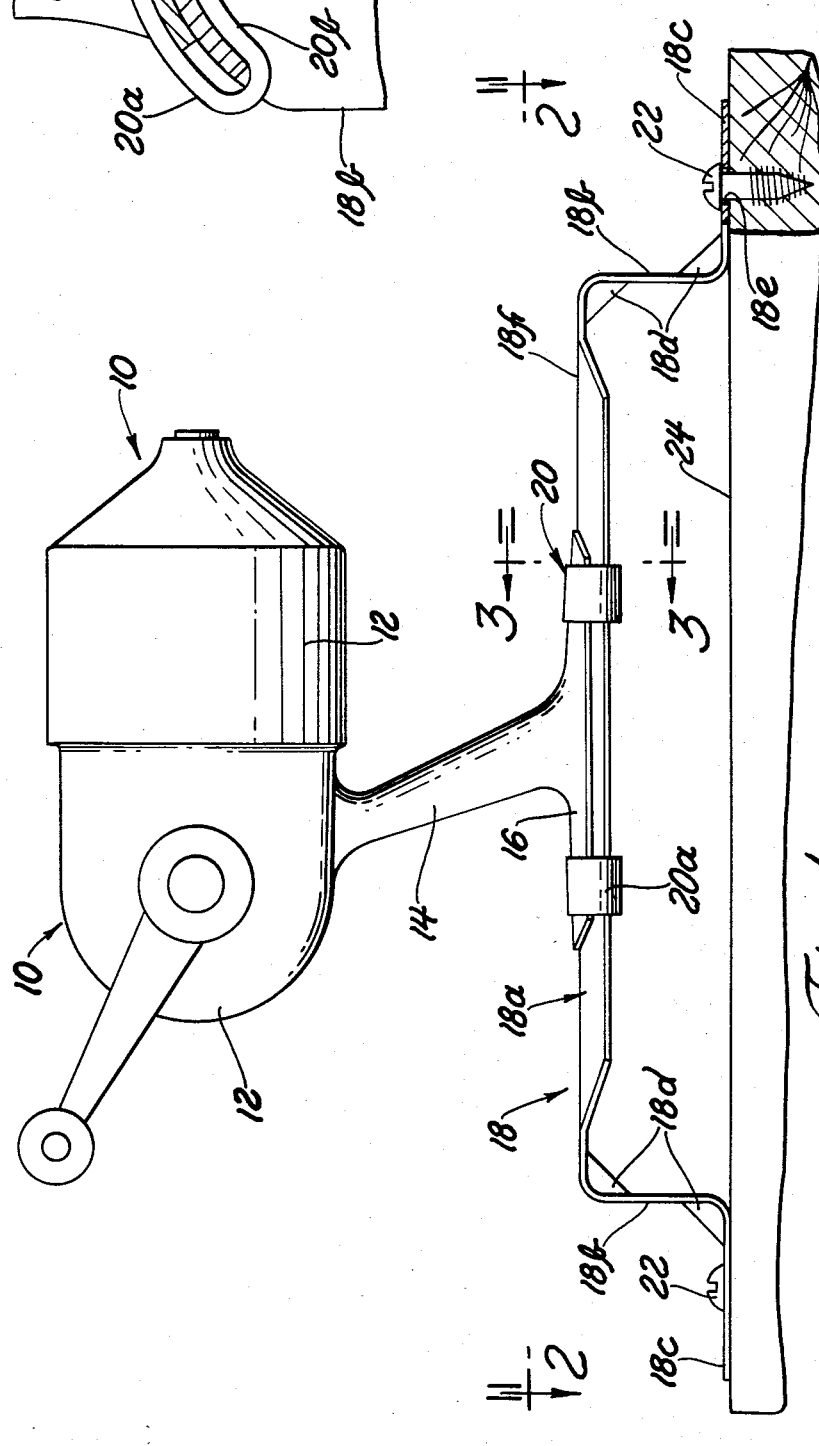

MOUNTING BRACKET ASSEMBLY FOR FISHING REELS

BACKGROUND OF THE INVENTION

This invention relates to storage devices for fishing reels and, more particularily, to a mounting bracket assembly particularly adapted for use in storing fishing reels.

The typical fisherman maintains numerous fishing reels for use in a variety of fishing applications and environments. The reels not currently in use are typically put in drawers, loosely stored in a conventional tackle box, left lying on tables or otherwise stored in haphazard fashion. This haphazard storage often results in damage to the reels. Reel storage devices have previously been proposed. None of these devices have achieved wide spread use however since they have either been prohibitively expensive to produce, limited in their applications, or complicated to use.

SUMMARY OF THE INVENTION

Accordingly, it is the object of the present invention to provide a storage device for fishing reels that is inexpensive to manufacture, universal in application, and simple in use.

The invention storage device is designed for use with the typical fishing reel in which a pedestal extends downwardly from the reel housing and terminates in an arcuate foot portion. The invention storage device includes a bracket having an elongated main body portion defining an elongated arcuate seating surface and a pair of retaining clips which are slidably mounted on the main body portion of the bracket and dimensioned and configured to slide snugly over the opposite ends of a fishing reel foot portion seated on the seating surface to firmly secure the foot portion and the fishing reel to the bracket. Leg portions extend from each end of the main body portion of the bracket and mounting means are provided on the free ends of the leg portions for coaction with fastener elements to mount the bracket on a suitable support surface with the bracket main body portion spaced from the support surface.

According to a further feature of the invention, the main body portion of the bracket is arcuate in transverse cross section to define a convex outer surface constituting the seating surface and a concave inner surface and the retainer clips are arcuate in transverse cross section to define a convex outer portion slidable over the opposite ends of the foot portions of the fishing reel and a concave inner portion juxtaposed to and guiding slidably along the concave inner surface of the main body portion of the bracket to preclude rotation of the stored reel relative to the bracket.

In the disclosed embodiment of the invention, the bracket is formed from a single elongated strip of metallic material which is suitably bent and shaped to provide the various portions and surfaces of the bracket and the retainer clips comprise simple closed loops of a similar metallic material.

BRIEF DESCRIPTION OF THE DRAWINGS

FIG. 1 is an elevational view showing the invention mounting bracket assembly in use with a conventional fishing reel; and FIGS. 2 and 3 are views taken on lines 2—2 and 3—3, respectively, of FIG. 1.

DETAILED DESCRIPTION OF THE PREFERRED EMBODIMENT

The conventional fishing reel 10 seen in FIG. 1 includes a reel housing 12 and a pedestal portion 14 extending downwardly from the reel housing and terminating in a foot portion 16 having a transverse arcuate cross section configured to seat on the curved surface of a fishing rod.

The invention mounting bracket assembly, broadly considered, comprises a mounting bracket 18 and a pair of retainer clips 20.

Bracket 18 includes a main body portion 18a, leg portions 18b depending from each end of main body portion 18a, and flange portions 18c extending outwardly and oppositely from the lower or free ends of leg portions 18b. Portions 18a, 18b, and 18c are right angularly disposed and rib sections 18d are stampingly formed at each juncture of adjoining portions to provide rigidity for the bracket. Each flange portion includes a mounting hole 18e for passage of a suitable fastener such as a screw 22 to secure the bracket to a suitable support surface 24 with main body portion 18a disposed parallel to and spaced from support surface 24. Main body portion 18a is shaped to provide a seating surface for foot portion 16 of fishing reel 10. Specifically, bracket main body portion 18a is stampingly shaped to provide a transverse arcuate cross section defining a convex outer surface 18f having a radius of curvature generally corresponding to the radius of curvature of reel foot portion 16 and a concave inner surface 18g. The lengthwise dimension of surface 18f is substantially longer than the lengthwise dimension of foot portion 16 so as to handily accommodate the foot portion. Bracket 18 comprises a single unitary strip of metallic material and may be inexpensively and quickly formed in a series of simple bending and stamping operations.

Retainer clips 20 are slidably mounted on bracket main body portion 18a and are dimensioned and configured to slide snugly over the opposite ends of the foot portion 16 of a fishing reel 10 to firmly secure the fishing reel to the bracket. Specifically, each clip 20 is formed as a closed loop and is arcuate in transverse cross section to define a convex outer portion 20a and a concave inner portion 20b. Portions 20a and 20b have a radius of curvature generally corresponding to that of reel foot portion 16 and bracket arcuate surface 18f. Each clip 20 is dimensioned to slide easily along bracket main body portion 18a and to provide a snug fit when the clips are slid over the ends of the foot portion of the reel. The concave inner portion 20b of each clip is juxtaposed to and guides slidably along the inner concave surface 18g of the bracket main body portion to preclude rotation of the clip relative to the bracket and preclude rotation of the stored fishing reel relative to the bracket when the opposite ends of the reel foot portion are engaged by the clips. Clips 20 are formed from seamless round tubing, cut and formed to required shape in a simple stamping operation.

The invention bracket assembly will be seen in provide an effective and efficient device for storing fishing reels. Specifically, the invention bracket assembly has universal application since it may be secured to any support surface irrespective of the material of the support surface and irrespective of the attitude of the support surface. Further, the invention bracket assembly may be very inexpensively produced since it is simply and quickly formed from standard shaped steel mill materials. And the invention bracket assembly is extremely easy to use since it requires only a simply sliding movement of the retainer clips to mount the reel and a simple reverse sliding movement of the retainer clips to dismount the reel.

Although a preferred embodiment of the invention has been illustrated and described in detail, it will be apparent that various changes may be made in the preferred embodiment without departing from the scope or spirit of the invention.

The embodiments of the invention in which an exclusive property or privilege is claimed are defined as follows:

1. A mounting bracket assembly for storing fishing reels of the type having a pedestal portion terminating in a foot portion of arcuate cross section, said assembly comprising:
   A. a bracket having
      1. an elongated main body portion defining an elongated arcuate seating surface having a radius of curvature generally corresponding to that of the foot portion of a fishing reel to be stored,
      2. leg portions extending from each end of said main body portion in a direction toward the center of curvature of said seating surface, and
      3. mounting means on the free ends of said leg portions for coaction with fastener elements to mount said bracket on a suitable support surface with said main body portion spaced from the support surface; and
   B. a pair of retainer clips slidably mounted on said main body portion and dimensioned and configured to slide snugly over the opposite ends of a fishing reel foot portion seated on said seating surface to firmly secure the foot portion and thereby the fishing reel to the bracket.

2. A bracket assembly according to claim 1 wherein:
   C. said main body portion is arcuate in transverse cross section to define a convex outer surface constituting said seating surface and a concave inner surface;
   D. said retainer clips engage said concave inner surface to preclude rotation of the clips and thereby the fishing reel relative to the bracket.

3. A bracket assembly according to claim 2 wherein:
   E. said retainer clips are formed as a closed loop and are arcuate in transverse cross section to define a convex outer portion slidable over the opposite ends of the foot portion of the stored reel and and a concave inner portion juxtaposed to and guiding slidably along said inner surface of said bracket main body portion.

4. A bracket assembly according to claim 3 wherein:
   F. said mounting means comprises flange portions extending outwardly and oppositely away from the free ends of said leg portions and having mounting holes to receive suitable fastener elements.

5. A bracket assembly according to claim 4 wherein:
   G. said bracket is formed of a single elongated strip of metallic material and defines, serially, a flange portion, a leg portion extending outwardly from one end of said flange portion, a main body portion extending from the free end of said flange portion in a direction parallel to but opposite from said flange portion and shaped intermediate its ends to define said arcuate cross section, another leg portion extending inwardly from the free end of said main body portion and another flange portion extending from the free end of said other leg portion; and
   H. said retainer clips are formed as simple closed loops of similar metallic material.

6. A mounting bracket assembly for storing fishing reels of the type having a pedestal portion terminating in a foot portion of arcuate cross section, said assembly comprising:
   A. a bracket having
      1. an elongated main body portion having an arcuate transverse cross section defining a convex outer seating surface having a radius of curvature generally corresponding to that of the foot portion of a fishing reel to be stored and a concave inner surface;
      2. mounting means for coaction with fastener elements to mount said bracket on a suitable support surface with said seating surface spaced from the support surface; and
   B. a pair of retainer clips having a transverse arcuate cross section and including a convex outer portion, having a radius of curvature generally corresponding to that of said seating surface and slidable over the opposite ends of a fishing reel foot portion positioned on said seating surface to firmly mount the fishing reel on said bracket, and a concave inner portion juxtaposed to and guiding slidably along the concave inner surface of said main body portion to preclude rotation of the clip and thereby the stored reel relative to the bracket.

7. A mounting bracket assembly according to claim 6 wherein:
   C. said mounting means comprise:
      1. leg portions extending from the opposite ends of said main body portion toward the center of curvature of said seating surface; and
      2. flange portions extending outwardly and oppositely away from the free ends of said leg portions and including mounting holes for passage of the fastener elements.

8. In a fishing reel and mounting bracket assembly of the type including a fishing reel having a pedestal portion terminating in an arcuate foot portion and a mounting bracket assembly for storing said fishing reel, the improvement wherein said mounting bracket assembly comprises:
   A. a bracket having:
      1. an elongated main body portion defining an elongated arcuate seating surface having a radius of curvature generally corresponding to that of said foot portion of said fishing reel,
      2. leg portions extending from each end of said main body portion in a direction toward the center or curvature of said seating surface, and
      3. mounting means on the free ends of said leg portions for coaction with fastener elements to mount said bracket on a suitable support surface with said main body portion spaced from the support surface; and
   B. a pair of retainer clips slidably mounted on said main body portion and dimensioned and configured to slide snugly over the opposite ends of said foot portion with the latter seated on said seating surface to firmly secure said foot portion and thereby said fishing reel to said bracket.

9. A fishing reel and mounting bracket assembly according claim 8 wherein:

C. said main body portion is arcuate in transverse cross section to define a convex outer surface constituting said seating surface and a concave inner surface;

D. said retainer clips are formed as a closed loop and arcuate in transverse cross section to define a convex outer portion slidable over the opposite ends of said foot portion and a concave inner portion juxtaposed to and guiding slidably along said concave inner surface of said bracket main body portion to preclude rotation of said fishing reel relative to said bracket.

10. A mounting bracket assembly for storing fishing reels of the type having a pedestal portion terminating in an elongated foot portion, said assembly comprising:

A. a bracket having
  1. an elongated main body portion defining an elongated upper seating surface having a cross sectional configuration generally corresponding to that of the lower seating surface of the foot portion of a fishing reel to be stored,
  2. leg portions extending downwardly from each end of said main body portion, and
  3. mounting means on the free ends of said leg portions for coaction with fastener elements to mount said bracket on a suitable support surface with said main body portion spaced from the support surface; and B. a pair of retainer clips slidably mounted on said main body portion and dimensioned and configured to slide snugly over the opposite ends of a fishing reel foot portion seated on said main body seating surface to firmly secure the foot portion and thereby the fishing reel to the bracket.

* * * * *